United States Patent [19]
Bridges

[11] 3,880,444
[45] Apr. 29, 1975

[54] MEANS TO ADJUST WHEEL SUPPORT PIVOT SHAFT

[76] Inventor: Alvin C. Bridges, 1099 California Dr., Burlingame, Calif. 94010

[22] Filed: Feb. 22, 1974

[21] Appl. No.: 444,738

[52] U.S. Cl. ............................. 280/96.2 B
[51] Int. Cl. ............................. B62d 17/00
[58] Field of Search ......... 280/96.2 R, 96.2 B, 96.1; 151/54, 44, 68

[56] References Cited
UNITED STATES PATENTS

| | | | |
|---|---|---|---|
| 1,643,034 | 9/1927 | Sirl | 151/54 |
| 2,002,403 | 5/1935 | Kosma | 151/54 |
| 2,198,544 | 4/1940 | Leighton | 280/96.2 B |
| 2,890,893 | 6/1959 | Laukhuff | 280/96.2 B |
| 3,060,444 | 10/1962 | Hoffmaster et al. | 151/68 |
| 3,124,370 | 3/1964 | Traugott | 280/96.2 B |
| 3,163,441 | 12/1964 | Traugott | 280/96.2 B |
| 3,466,965 | 9/1969 | McCarthy | 151/68 |
| 3,526,413 | 9/1970 | Muller | 280/96.2 R |

Primary Examiner—Kenneth H. Betts
Assistant Examiner—Jack D. Rubenstein
Attorney, Agent, or Firm—George B. White

[57] ABSTRACT

The support arm for the wheel of an automobile is pivoted on a pivotal shaft which is journalled in a channel frame of the automobile. In this invention the pivot shaft has each end secured eccentrically in a hub rotatable in a circular hole in each leg of the channel frame; a hexagonal head fixed on the hub extends to the outside of the channel frame, the other end of the pivot shaft is threaded to receive a nut bearing against the flange of the other bushing; by loosening the nut and then turning the hexagonal head and hub the position of the pivot shaft is shifted thereby adjusting the position of the wheel particularly with relation to the so-called caster and camber of the wheel; the pivot shaft is locked in the adjusted position by means of a locking plate, the socket in the locking plate fits over the hexagonal head; means being provided to secure the locking plate on the channel frame in locking position.

1 Claim, 6 Drawing Figures

MEANS TO ADJUST WHEEL SUPPORT PIVOT SHAFT

BACKGROUND OF THE INVENTION

The problem of adjustability of the supporting arm and the wheels on automobiles has been approached in various ways. The most practical is demonstrated in U.S. Pat. Nos. 3,124,370 and 3,163,441, Traugott, in both of which there is reliance on interlocking serrated members for holding the shaft in an adjusted position by preventing the turning of the bushing or bearing in which the shaft is held eccentrically. These are on the market at the present time but in practice under sudden shocks or sudden increase of force or impact the arm still turns the bushings and sometimes strips the serrations and thereby displaces the adjustment. Other prior patents produced by a preliminary search are Muller U.S. Pat. No. 3,273,909 which relies on opposite adjusting screws for adjustment; Kost U.S. Pat. No. 2,923,555 which is a rather complex structure; Weiss U.S. Pat. No. 2,978,253 also with a complex construction.

The primary object of the instant invention is to provide positive locking for bushings in the channel frame in which the pivot shaft is mounted eccentrically so that any accidental displacement or change of the adjustment is obviated; another object of the invention is to provide a simple device with a minimum number of parts which can be quickly and easily assembled and which operates positively, facilitates adjustment, and holds the adjustment indefinitely under all stress conditions.

DETAILED DESCRIPTION

Figure 1:
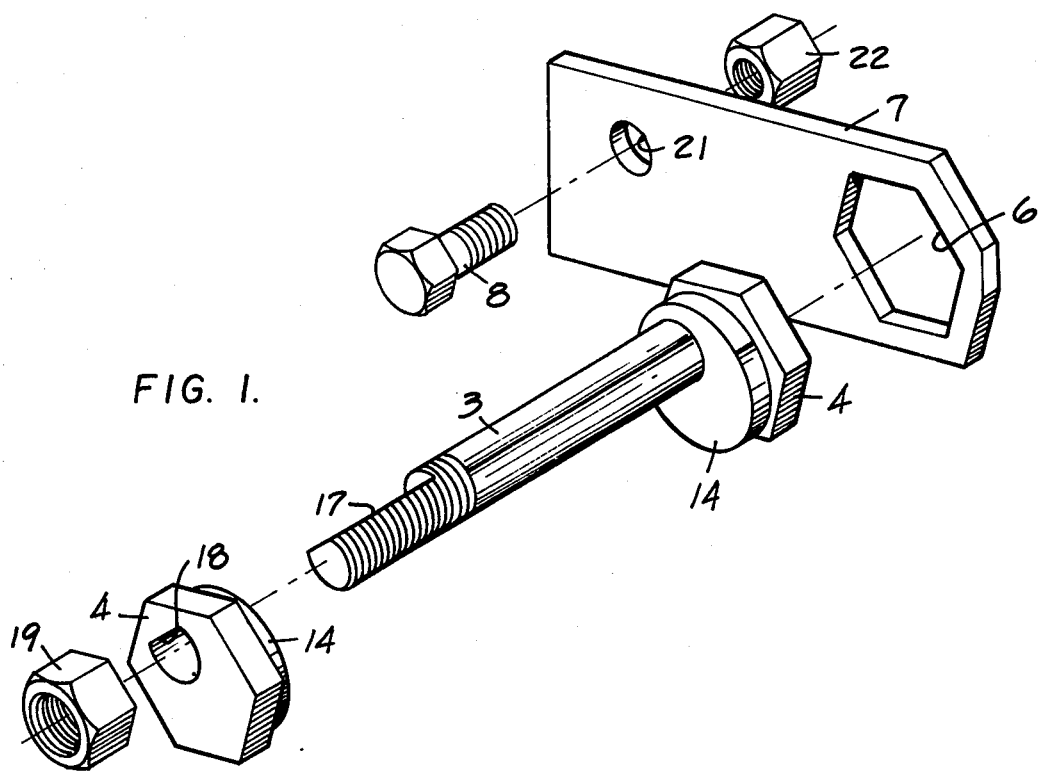
FIG. 1 is a developed view of the pivot shaft and its lock.
Figure 2:
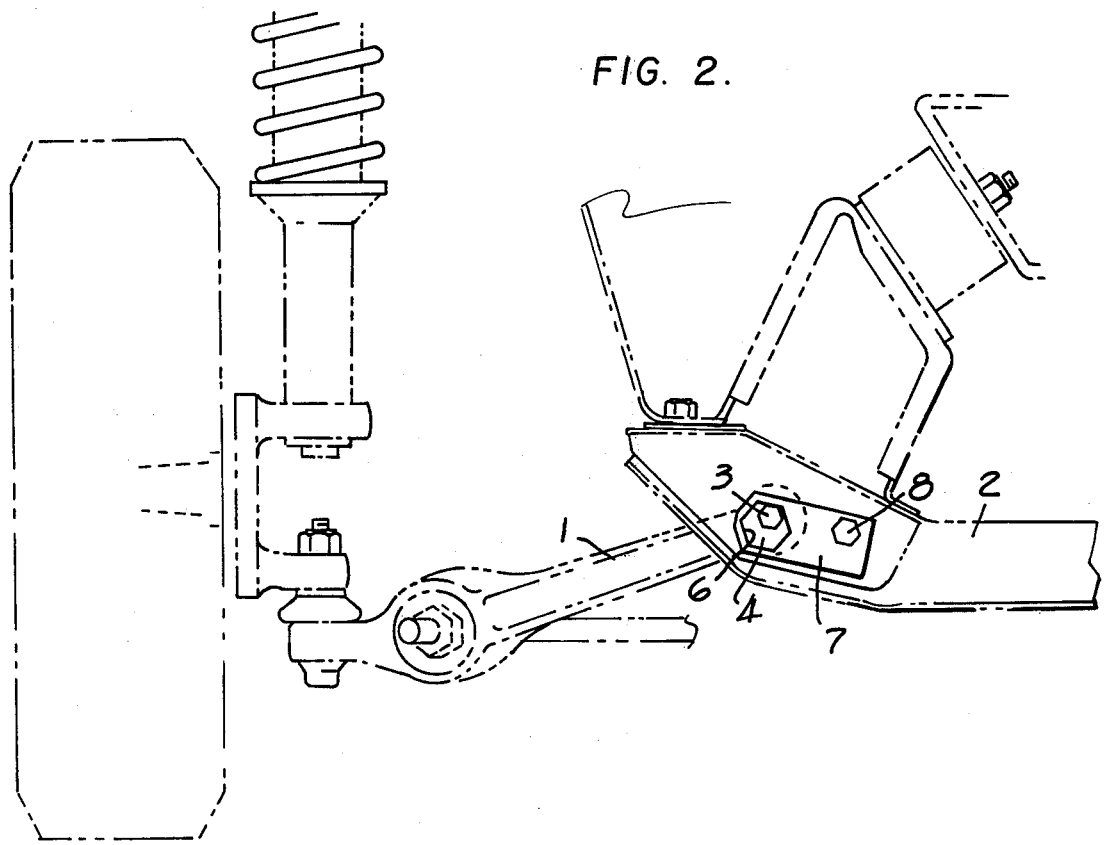
FIG. 2 is a phantom view of the general arrangement on one type of automobile.

As shown in FIG. 2 the arm 1 is supported on a pivot in the channel of the channel frame 2. The pivot shaft 3 is shown eccentrically with respect to the hexagonal head 4, which latter is locked against turning or rotation by the socket 6 of the locking plate 7. The locking plate 7 is secured in the locking position by a suitable bolt 8.

Figure 3:
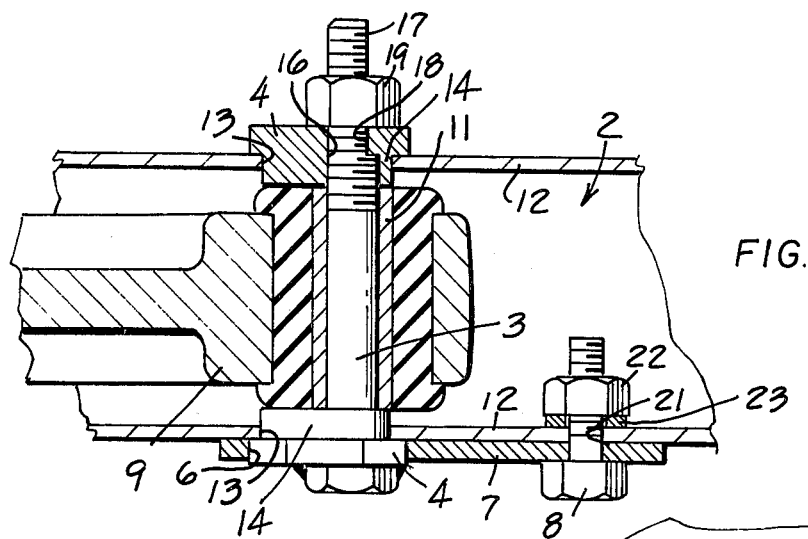
FIG. 3 is a sectional view of the pivot shaft mounting, the section being taken on lines 3—3 of FIG. 4.

Referring to FIG. 3, the bearing end 9 of the arm 1 is suitably journalled by a bearing 11 therein on the pivot shaft 3 between the legs 12 of the channel member 2. Each leg 12 of the channel 2 has registering holes 13. A cylindrical bushing 14 is positioned in each hole 13. Each bushing 14 has a hexagonal head 4 which abuts against the outside surface of the adjacent channel leg 12. Each bushing 14 and head 4 has an eccentric hole 16 and the pivot shaft 3 extends through said holes 16. The head and bushing assembly is integral with one end of the pivot shaft 3. The other end of the pivot shaft has an end portion cut away and the hole 16 in the other head and bushing assembly is reduced at its outer end so that the flat cut away side 17 of the pivot shaft 3 engages a corresponding flat side 18 of the reduced portion of this hole 16. In this manner, when the integral head 4 is turned the other head and bushing will also turn therewith maintaining the holes 16 in alignment. A nut 19 on the threaded reduced end of the pivot shaft 3 is used for tightening the pivot shaft in position.

The locking plate 7 and its socket 6 are shown in FIG. 3 in locking engagement to the integral hexagon head 4. The bolt 8 extends through a hole 21 in the adjacent channel leg 12 and is held in place by a suitable nut 22 and lock washer 23.

Figure 4:
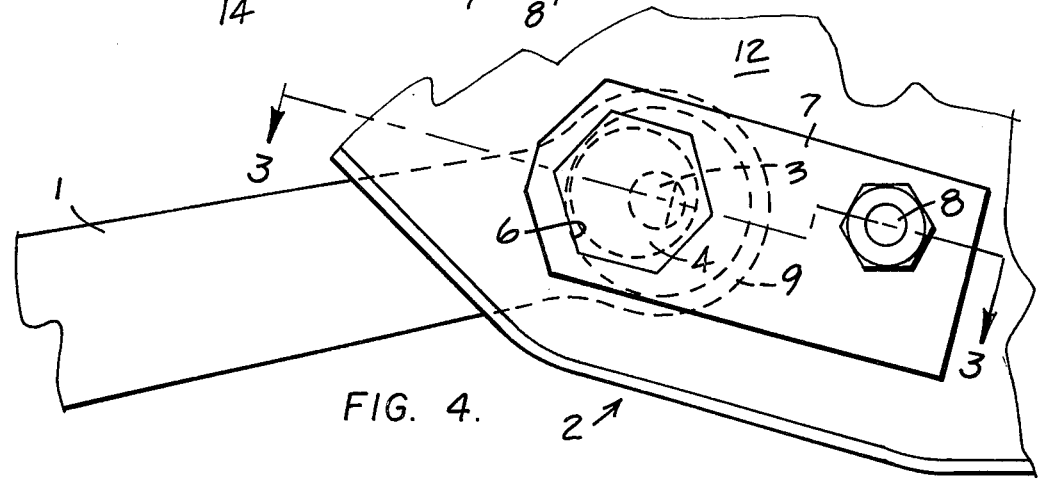
FIG. 4 is a fragmental view showing the locking position in one adjustment of the pivot shaft.
Figure 5:
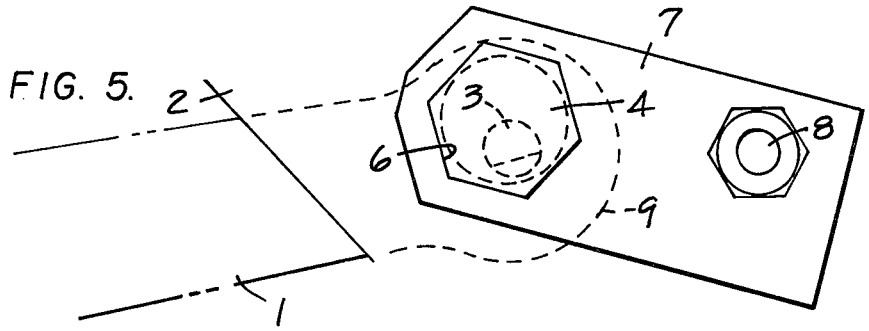
FIG. 5 is a view of the locked pivot shaft in a different adjustment.
Figure 6:
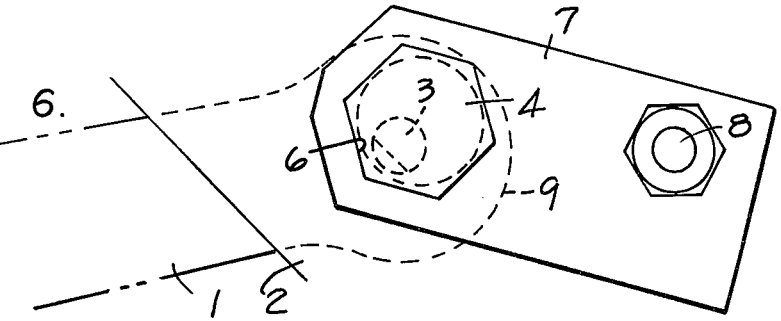
FIG. 6 is a view showing the pivot shaft in a still further different adjustment.

In operation the bolt 8 is loosened sufficiently to allow the withdrawal of the socket 6 from the hexagonal head 4 thereby to free the hexagonal head 4 from engagement by a suitable tool for turning in the direction required for the desired adjustment. For instance, in order to adjust the pivot shaft position from its extreme rearward position toward the front of the frame the head 4 and the entire pivot shaft assembly is turned in a clockwise direction from the position shown in FIG. 4 into the position shown in FIG. 5. To adjust the pivot position further forward, the head 4 and the entire pivot assembly is turned further clockwise from the position shown in FIG. 5 into the position shown in FIG. 6.

The very simple structure forms in essence a compact pivotal support with good facility for adjustment and for positive locking in the adjusted positions. The installing of this pivot assembly requires only the enlarging of the usual hole to the size of holes 13 in the channel legs 12, and thereafter the pivot shaft is inserted through the arm bearing 11, and the bushing 14 and head 4 with the reduced hole 18 is placed over the free end of the pivot shaft 3 and secured in place by the nut 19. The herein structure entirely eliminates the possibility of accidental maladjustment of the pivot shaft by any strain or stress circumstances.

I claim:

1. In a means to adjust a wheel support pivot shaft in a frame member of a vehicle, said member having registering holes for said pivot shaft, the diameter of said holes being larger than that of the pivot shaft, a polygonal head on one end of said shaft, a cylindrical smooth hub on the face of the head adjacent the shaft, being, rotatable in the adjacent hole in the frame, said one end of said shaft being fixed to said head so as to be located eccentrically to said hub, the other end of said shaft being threaded, and a substantially semi-cylindrical portion thereof being cut away, a removable head on said threaded end of said shaft, a cylindrical smooth hub on said removable head fitting into the adjacent hole in said frame, said threaded end being extended eccentrically through said hub and removable head, said removable head having a passage therethrough conforming in shape to said semi-cylindrical portion thereby to coordinate the relative position of said heads and hubs, said threaded end extending beyond said removable head, a tightening nut on said extended end to hold said removable head in position, a locking arm on the outside of the frame member adjacent said polygonal head, said locking arm having a polygonal socket therein fitting entirely over said polygonal head, and releasable means to fixedly secure said locking arm in locking position on said frame member thereby to prevent rotation of said heads, said hubs and said pivot shafts.

* * * * *